US009342487B2

United States Patent
Georgiev (10) Patent No.: US 9,342,487 B2
(45) Date of Patent: May 17, 2016

(54) METHOD FOR LAYOUT OF SPEECH BUBBLES ASSOCIATED WITH CHARACTERS IN AN IMAGE

(71) Applicant: Adobe Systems Incorporated, San Jose, CA (US)

(72) Inventor: Evtim Ivanov Georgiev, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 178 days.

(21) Appl. No.: 14/017,633

(22) Filed: Sep. 4, 2013

(65) Prior Publication Data

US 2015/0067482 A1 Mar. 5, 2015

(51) Int. Cl.
| G06F 17/00 | (2006.01) |
| G06F 17/21 | (2006.01) |
| G06F 3/16 | (2006.01) |
| G06T 11/60 | (2006.01) |

(52) U.S. Cl.
CPC .............. *G06F 17/211* (2013.01); *G06F 3/167* (2013.01); *G06F 17/212* (2013.01); *G06T 11/60* (2013.01)

(58) Field of Classification Search
CPC .......................... G06F 17/211; G06F 17/212
See application file for complete search history.

(56) References Cited

U.S. PATENT DOCUMENTS

| 5,544,305 | A * | 8/1996 | Ohmaye et al. ............... 715/776 |
| 2007/0156910 | A1* | 7/2007 | Christie .................. H04L 51/04 709/227 |
| 2011/0138271 | A1* | 6/2011 | Tobita .......................... 715/246 |
| 2011/0317984 | A1* | 12/2011 | Masutani ..................... 386/285 |
| 2012/0117473 | A1* | 5/2012 | Han et al. ..................... 715/723 |
| 2013/0031479 | A1* | 1/2013 | Flowers ....................... 715/716 |
| 2013/0104015 | A1* | 4/2013 | Nonaka ........................ 715/204 |
| 2013/0194280 | A1* | 8/2013 | Kwon et al. .................. 345/473 |
| 2013/0227439 | A1* | 8/2013 | Shin ............................. 715/758 |
| 2013/0283157 | A1* | 10/2013 | Ebata ........................... 715/265 |

\* cited by examiner

*Primary Examiner* — Laurie Ries (74) *Attorney, Agent, or Firm* — Shook, Hardy & Bacon L.L.P.

(57) ABSTRACT

A system and method of speech bubbles layout are described. A context module determines geometric constraints of speech bubbles for characters in an image and features of the characters in the image, receives a speech content for one or more characters, and identifies a conversation order of the characters. A layout module generates a layout of the speech bubbles based on the features of the characters, the speech content, and the conversation order. The layout of the speech bubbles is within the geometric constraints of the speech bubbles in the image.

19 Claims, 11 Drawing Sheets

METHOD FOR LAYOUT OF SPEECH BUBBLES ASSOCIATED WITH CHARACTERS IN AN IMAGE

TECHNICAL FIELD

The present application relates generally to the technical field of computer graphics, and, in various embodiments, to systems and methods for layout of speech bubbles in images.

BACKGROUND

Speech bubbles, such as the ones illustrated in comic strips, can provide an entertainment context for photos and illustrations, turning the photos into stories. However, the amount of effort needed to create and maintain proper speech bubble layout gets in the way of creating the story. For example, existing solutions for adding speech bubbles rely on the user performing many manual edits, such as picking the shape of the bubble and adjusting its size, position, and orientation. Furthermore, any subsequent revisions to the text, image frame, and type of bubble depend on the users manually readjusting the layout of the bubbles.

BRIEF DESCRIPTION OF THE DRAWINGS

Some embodiments of the present disclosure are illustrated by way of example and not limitation in the figures of the accompanying drawings, in which like reference numbers indicate similar elements and in which.

DETAILED DESCRIPTION

The description that follows includes illustrative systems, methods, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

A system and method of speech bubbles layout are described. Geometric constraints of speech bubbles for characters in an image are determined. The geographic constraints may include limitations as to locations, positions, dimensions, shapes, and sizes of the speech bubbles in the image. Features of the characters or persons in the image may also be determined. The features of the characters or persons may identify how many characters are shown in the image, the orientation of respective faces of the characters, and the locations of the mouths of the characters. Speech content for the characters may be received. For example, the speech content may include text, images, or symbols. The order of conversation between the characters may be identified. For example, the first character to speak may be identified with the corresponding speech content.

A layout of the speech bubbles may be generated through an iterative process based on the geometric constraints of the speech bubbles in the image, the features of the characters, the speech content, and the conversation order. The layout may identify the location and size of each speech bubble, the size of the text within each speech bubble, and the arrangement of the speech bubbles with respect to each other. The layout of the speech bubbles is such that the speech bubbles satisfy and meet the geometric constraints in the image.

Figure 1:
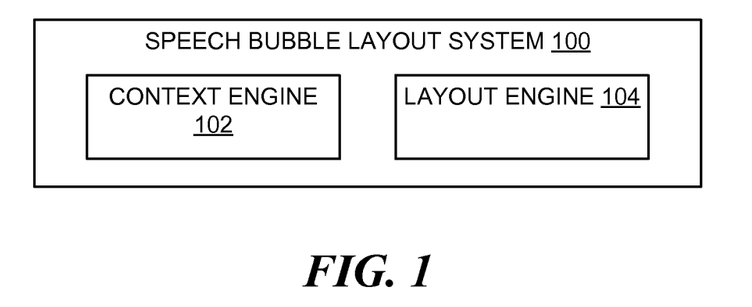
FIG. 1 illustrates an example embodiment of a speech bubble layout system.

FIG. 1 illustrates an example embodiment of a speech bubble layout system 100 used to generate a layout for speech bubbles in an image or a picture. The speech bubble layout system 100 may include a context engine 102 and a layout engine 104. In one example embodiment, the context engine 102 may determine geometric constraints of speech bubbles for characters in an image and features of the characters in the image. The context engine 102 may also receive a speech content for one or more characters, and identify a conversation order of the characters. In one embodiment, the context engine 102 receives user-defined constraints for the speech bubbles. The layout engine 104 then generates the layout of the speech bubbles based on the user-defined constraints of the speech bubbles. The components and operation of the context engine 102 are described in more detail below with respect to FIG. 2.

In another example embodiment, the layout engine 104 generates a layout of the speech bubbles based on the features of the characters, the speech content, and the conversation order. The layout of the speech bubbles may be configured such that each speech bubble is arranged relative to the other speech bubbles within the geometric constraints of the speech bubbles in the image. In another embodiment, the layout engine 104 modifies the speech content of the characters and adjusts the layout of the speech bubbles based on the modified speech content of the characters. The speech content includes, for example, a font type of the content and a size of the content. The geometric constraints of the speech bubbles are based on speech bubble geometric dimensions. The layout engine 104 is described in more detail below with respect to FIG. 3.

Figure 2:
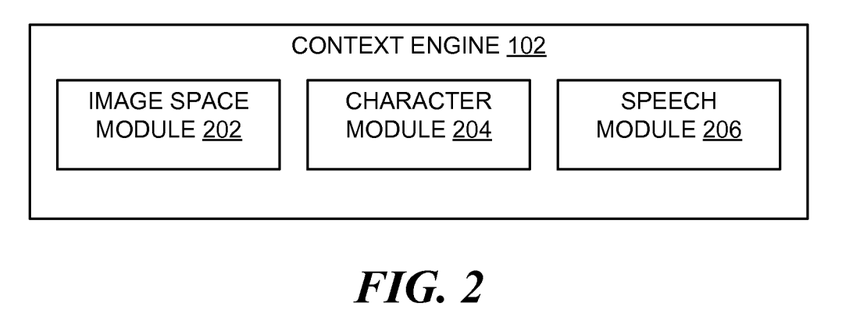
FIG. 2 illustrates an example embodiment of a context engine.

FIG. 2 illustrates an example embodiment of the context engine 102. The context engine 102 may include, for example, an image space module 202, a character module 204, and a speech module 206. The image space module 202 determines visible areas in the image for the speech bubbles. For example, the visible areas may defined by the boundaries of the image (e.g., a border of the image) and the characters (e.g., an outline of the faces of the characters). A visible area for a speech bubble may be located next to a corresponding character within the image and may include areas that do not overlap the faces of the characters in the image. In another example, the visible areas may extend beyond a border of the image and include a margin outside the image. The image space module 202 may adjust the size of the margin to define the amount of space the speech bubbles can extend outside the image (e.g., an outer border of the image).

In another embodiment, the image space module 202 determines the size of the image and normalizes a coordinate system for the size of the image (e.g., 0,0,1,1). The image space module 202 then determines visible areas for text and speech bubble imagery and identifies them with the normalized coordinate system.

The character module 204 identifies the features of the characters. For example, the features may include identifying a face of the characters (e.g., using facial detection algorithm). For example, a face area may be identified with a corresponding rectangle within the image as a result of a facial detection algorithm. The character module 204 may also determine the number of characters in the image using the facial detection algorithm. In one embodiment, the facial detection algorithm identifies faces of characters in the image. In another embodiment, a facial recognition algorithm may be applied to the image to identify each face against a database of faces.

The character module 204 also determines a speech source for each identified character based a position of a mouth of each corresponding identified character, and an orientation of a face of each corresponding identified character. In one embodiment, a vector of face orientation or direction may be generated as a result of the facial recognition algorithm.

The speech module 206 identifies a list of speech content for the characters. For example, a content dialog box may be associated with each character to receive the speech content for the corresponding character. The content dialog boxes may be presented in a list and ordered according to the order of conversation of the characters. For example, a first content dialog box may be presented in a top position for the first character to speak. A second content dialog box may be presented immediately below the first content dialog box for a second character to speak.

The speech content may include text, symbols, and images. The speech module 206 may identify a format of the text and symbols (e.g., font, position, color, and size).

In one embodiment, the speech module 206 may determine a type of speech bubble based on the type of speech content (e.g., a thought, an exclamation, a regular speech, a shout or a cry). For example, a speech bubble representing a thought is typically illustrated using little circles under the speech bubble.

In another embodiment, the user may provide user constraint such as pinning a frame of the speech bubble. A frame may be represented as a complete set of the position, size and layout of all bubble parts within the layout system. For example, the user may pin the specific location, shape, and size of a speech bubble on the image to maintain the pinned speech bubble static relative to other speech bubbles. In other words, the location, size, and shape of the other speech bubbles may be adjusted around and in reference to the speech bubble pinned by the user.

In another embodiment, the speech module 206 may generate speech content based on previous layouts generated from the layout engine 104. For example, the speech module 206 may copy a speech content of a speech bubble of a character from a previous layout.

Figure 3:
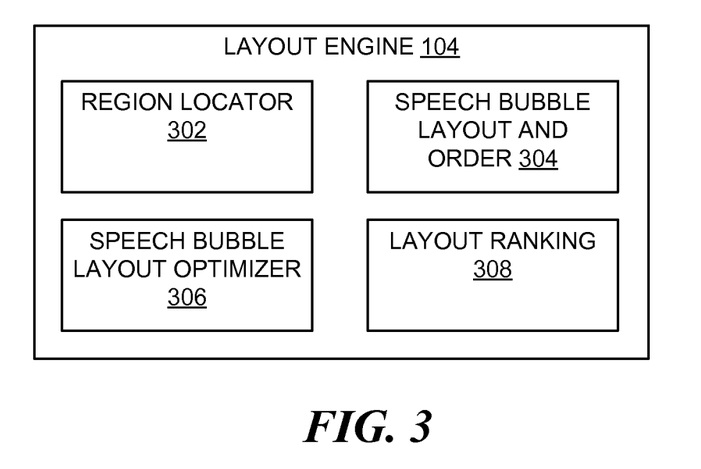
FIG. 3 illustrates an example embodiment of a layout engine.

FIG. 3 illustrates an example embodiment of the layout engine 104. The layout engine 104 may include, for example, a region locator 302, a speech bubble layout and order module 304, a speech bubble layout optimizer 306, and a layout ranking 308. The layout engine 104 provides a process that generates a layout for the speech bubbles based on input (e.g., data from the image space module 202, the character module 204, and the speech module 206). The layout engine 104 thus computes a layout of the speech bubbles based on constraints and the context of the image (e.g., boundaries, dimensions) determined by the context engine 102.

In one embodiment, the region locator 302 creates a list of important regions (i.e., not to be obscured by speech bubbles) based on, for example, visible area as determined by the image space module 202, character faces as determined by the character module 204, and the speech content as determined by the speech module 206. For example, an area of a face of a character may be deemed an important region not to be obscured by speech bubbles. In other words, the size and location of a speech bubble may not be positioned so as to block the face of the characters in the image. In another embodiment, the area not to be obscured may be adjustable to partially cover the face of a character. For example, a speech bubble may partially cover the hair of a character.

In one embodiment, the speech bubble layout and order module 304 generates, for each speech bubble, a possible flow of text layout and corresponding speech bubble sizes based on the possible text layouts. Examples of flow of text layout and corresponding speech bubble sizes are illustrated in FIGS. 6-12. The order of the speech bubbles may be based on the order of the conversation as determined by the speech module 206 of the context engine 102.

The speech bubble layout optimizer 306 generates possible speech bubble frames based on possible text-flow layouts, character, speech source, and speech bubble type. In other words, there is a multitude of positions, sizes, and formats for the speech bubbles. One specific layout of a speech bubble may be referred to as a frame of a speech bubble. In one embodiment, each speech bubble frame has a rank value that is determined based on meeting the constraints of the context engine 102.

The speech bubble layout optimizer 306 eliminates all possible frames that overlap any of the important regions as determined by the region locator 302. For pinned speech bubbles, pinned frames are used to generate the possible frames. The speech bubble layout optimizer 306 may take additional consideration based on what context values have changed since a last layout pass in regards to the pinned bubbles. For all speech bubbles and their respective possible frames and associated rank values, the speech bubble layout optimizer 306 iteratively computes a solution such that:

the solution consists of one frame per bubble from its associated set of possible frames.

bubbles do not overlap each other (as defined with per-frame non-overlap area from the image space module 202) and the speech content (e.g., text) lies within the speech bubble frame.

relative rank is minimized. In one embodiment, relative rank may be determined by the relative positions of bubble frames within one particular solution with regard to the precedence order of the speech content. For example, if a first speech content is "hi, how are you doing?" and second speech content is "I'm good, how are you?", then the relative rank of the first bubble appearing above the second bubble is better than the relative rank of the second bubble appearing on top. This is to ensure proper ordering of the dialog as represented by the speech bubbles.

sum of rank is minimized (within the set of solutions where the relative rank is minimized).

The layout ranking module 308 may generate an output that includes a set of possible solutions sorted by rank. In cases where the result set is an empty set, constraints can be relaxed. For example, changes to the size of the font, overlapping factors, and exclusion of speech may be made. The layout engine 104 may run another pass with the modified data.

One example implementation of the layout engine 104 to compute speech bubble layouts may be mathematically illustrated as follows:

For an image, there are N possible speech bubbles. For each speech bubble, there is an array of possible speech bubble positions around the corresponding faces in the image. The speech bubbles may be sorted by order of conversation.

The layout engine 104 determines a "layout solution" that is a specific position for each speech bubble. The layout solution may be represented by a vector of indices, where each element of the vector has the value of the index into the possible positions array of the corresponding speech bubble:

solution[i]==k-->position for bubble "i" is possible positions[i][k];

A layout solution can also be represented by a single number in a mixed-radix numeral system where for N speech bubbles, there are exactly N numeral positions. The radix for each numeral position may be equal to the number of possible speech bubble positions for the speech bubble corresponding to that numeral position.

The following is an example of the algorithm that can be described in these terms:

For example: three bubbles with 2, 3, 5 possible bubble positions respectively. All possible combinations (solutions) can be represented by numbers from 0 to 29.

The speech bubble layout optimizer 306 may compute a layout solution as follows:

1. Set the current solution to zero (set all digits to 0).

2. For the current solution, find two most-senior digits that correspond to incompatible speech bubble positions.

2a. If there are no incompatible speech bubble positions, then this is a valid solution. The speech bubble layout optimizer 306 remembers it and calculates its relative rank. In one embodiment, relative rank may be calculated as "breaks of flow of conversation." Since speech bubbles are sorted by order of conversation, for each speech bubble, the layout engine 104 looks only at the previous speech bubble and adds 0 or 1 respectively; 0 if the speech bubbles are placed "correctly" according to the conversation flow or 1 when the speech bubbles are placed "incorrectly". Then, a digit at numeral position 0 (with carry-over) for current solution is incremented. If this is not possible, this step ends. Otherwise the process continues with step 2b.

2b. The layout engine 104 lets the incompatible positions correspond to numeral positions i,j: i<j<N. All numeral positions <i are reset to zero and the digit is incremented at numeral position i (with carry-over) for current solution. If this is not possible to increment, this steps end here. Otherwise the process continues with step 2.

3. From all remembered solutions, the speech bubble layout optimizer 306 picks one with lowest relative rank and then the lowest sum of local ranks for each bubble positions (local ranks are predefined for each position relative to its face).

Figure 4:
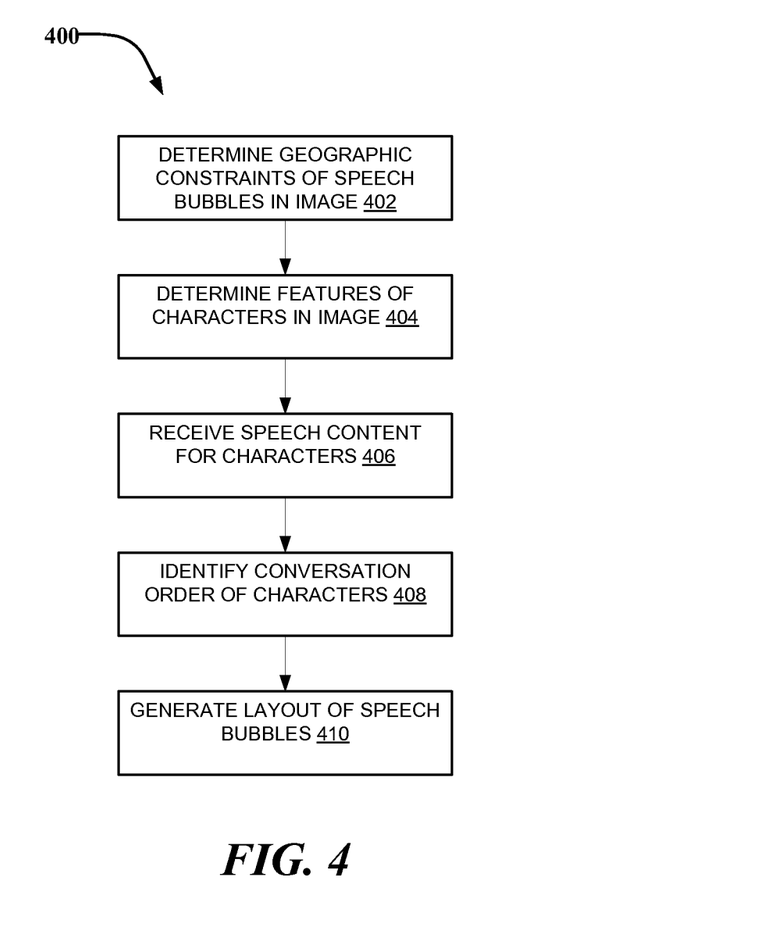
FIG. 4 is a flowchart illustrating an example embodiment of a method for generating a layout for speech bubbles in an image.

FIG. 4 is a flowchart illustrating an example embodiment of a method 400 for generating a layout for speech bubbles in an image. At operation 402, geographic constraints for speech bubbles in an image are determined. This operation may be implemented using the image space module 202 of FIG. 2. The image space module 202 determines visible areas in the image for the speech bubbles. As previously described, the visible areas may defined by the boundaries of the image (e.g., a border of the image) and the characters (e.g., an outline of the faces of the characters). A visible area for a speech bubble may be located next to a corresponding character within the image and may include areas that do not overlap the faces of the characters in the image. In another example, the visible areas may extend beyond a border of the image and include a margin outside the image. The image space module 202 may adjust the size of the margin to define the amount of space the speech bubbles can extend outside the image (e.g., an outer border of the image).

At operation 404, features of the characters in the image are determined. This operation may be implemented using the character module 204 of FIG. 2. For example, the features may include identifying a face of the characters (e.g., using a facial detection algorithm). For example, a face area may be identified with a corresponding rectangle within the image as a result of a facial detection algorithm. The character module 204 may also determine the number of characters in the image using the facial detection algorithm. In one embodiment, the facial detection algorithm identifies faces of characters in the image. In another embodiment, a facial recognition algorithm may be applied to the image to identify each face against a database of faces. A speech source for each identified character is also determined based on a position of a mouth of each corresponding identified character, and an orientation of a face of each corresponding identified character. In one embodiment, a vector of a face orientation may be generated as a result from the facial recognition algorithm.

At operation 406, speech content for the characters in the image is received. This operation may be implemented with the speech module 206 of FIG. 2. The speech module 206 identifies a list of speech content for the characters. For example, a content dialog box may be associated with each character to receive the speech content for the corresponding character. The speech content may include text, symbols, and images. The speech module 206 may identify a format of the text and symbols (e.g., font, position, color, and size). In one embodiment, a type of speech bubble may be determined based on the type of speech content (e.g., a thought, an exclamation, a regular speech, a shout or a cry). For example, a speech bubble representing a thought is typically illustrated using little circles under the speech bubble.

At operation 408, an order of a conversation of the characters is identified. This operation may be implemented with the speech module 206 of FIG. 2. The content dialog boxes may be presented in a list and ordered according to the order of conversation of the characters. For example, a first content dialog box may be presented in a top position for the first character to speak. A second content dialog box may be presented immediately below the first content dialog box for a second character to speak.

At operation 410, a layout of the speech bubbles is generated based on the geographic constraints, features of the characters, speech content, and order of conversation. This operation may be implemented with the layout engine 104 of FIG. 1. A layout for the speech bubbles may be generated based on input (e.g., data from the image space module 202, the character module 204, and the speech module 206). Thus, a layout of the speech bubbles may be computed based on constraints and the context of the image (e.g., boundaries, dimensions) determined by the context engine 102.

Figure 5:
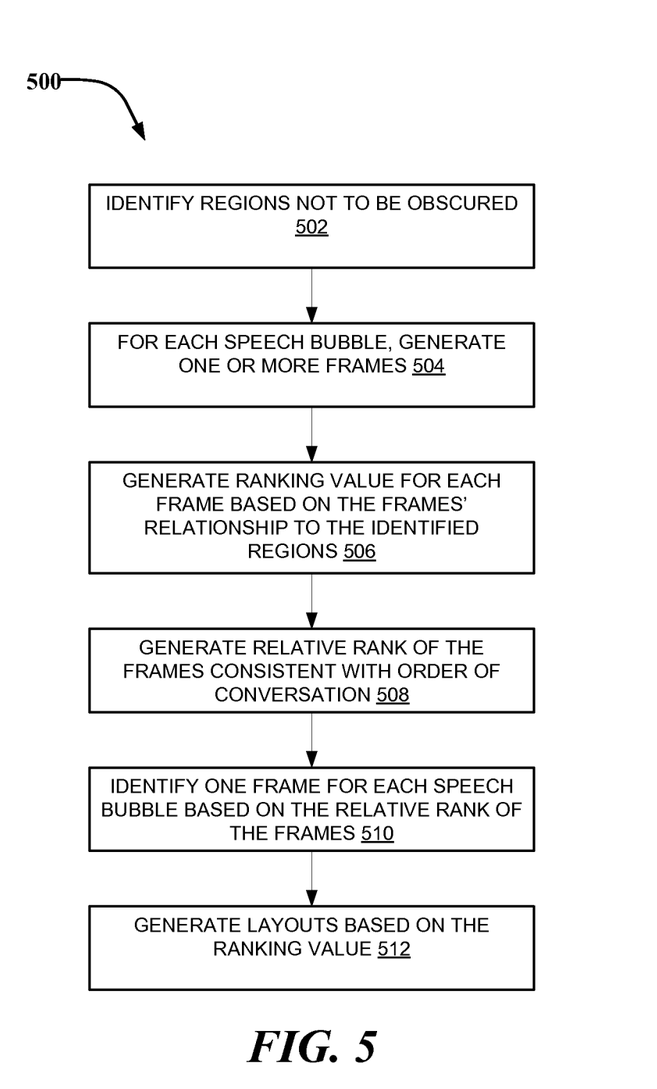
FIG. 5 is a flowchart illustrating another example embodiment of a method for generating a layout for speech bubbles in an image.

FIG. 5 is a flowchart illustrating another example embodiment of a method for generating a layout for speech bubbles in an image. At operation 502, regions or areas in the image not to be obscured by the speech bubbles are identified. At operation 504, for each speech bubble, one or more frame is generated. At operation 506, a ranking value is generated for each frame based on the frames' relationships to the identified regions. At operation 508, a relative rank of the frames consistent with an order of conversation is generated. At operation 510, one frame for each speech bubble is identified based on the relative rank of the frames. At operation 512, one or more layout is generated based on the ranking value.

Figure 6:
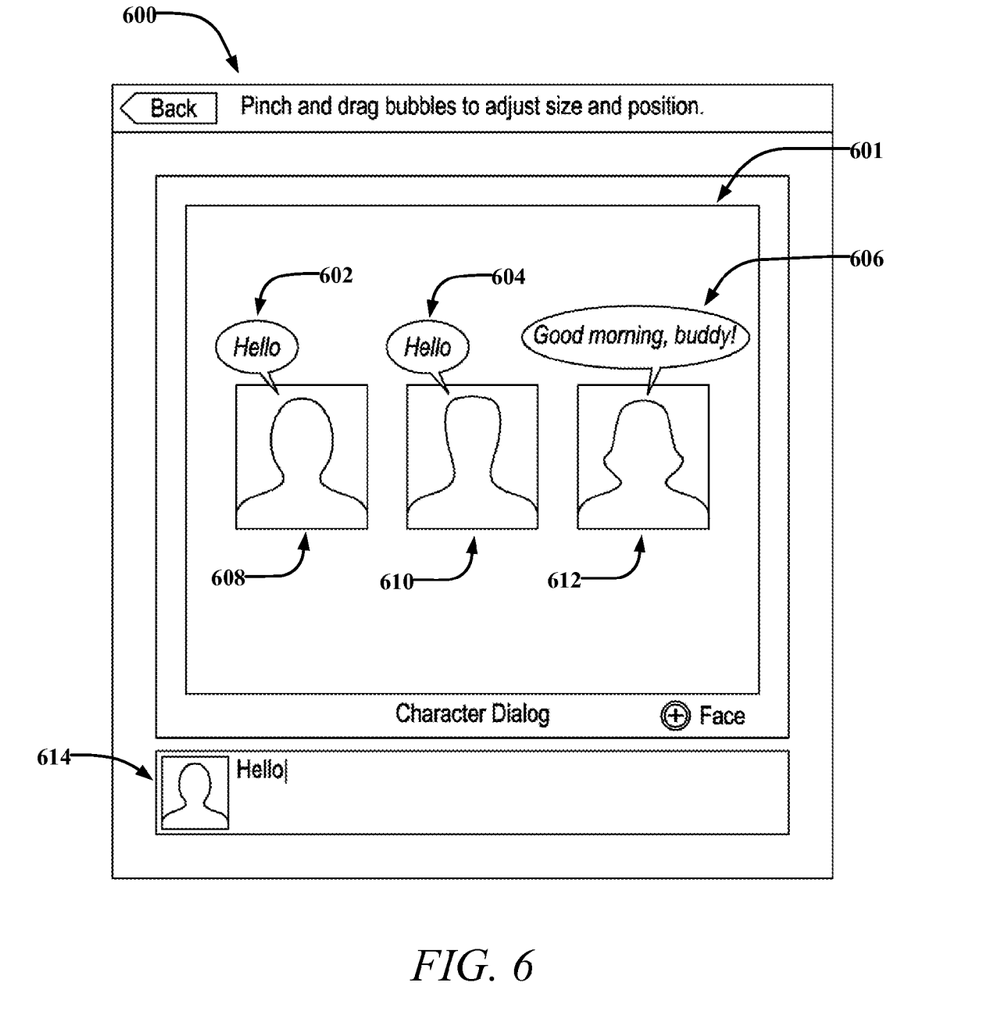
FIG. 6 illustrates an example screenshot of a speech bubble layout.

FIG. 6 illustrates an example screenshot 600 of a speech bubble layout. The image 601 illustrates three identified characters 608, 610, and 612. Corresponding speech bubbles 602, 604, 606 are associated with the identified characters 608, 610, and 612. An entry dialog box 614 enables a user to enter the speech content for each character 608, 610, 612. The order of the conversation may be based on the order in the entry dialog box 614. The tail of each speech bubble 602, 604, 606 faces the corresponding character 608, 610, 612.

Figure 7:
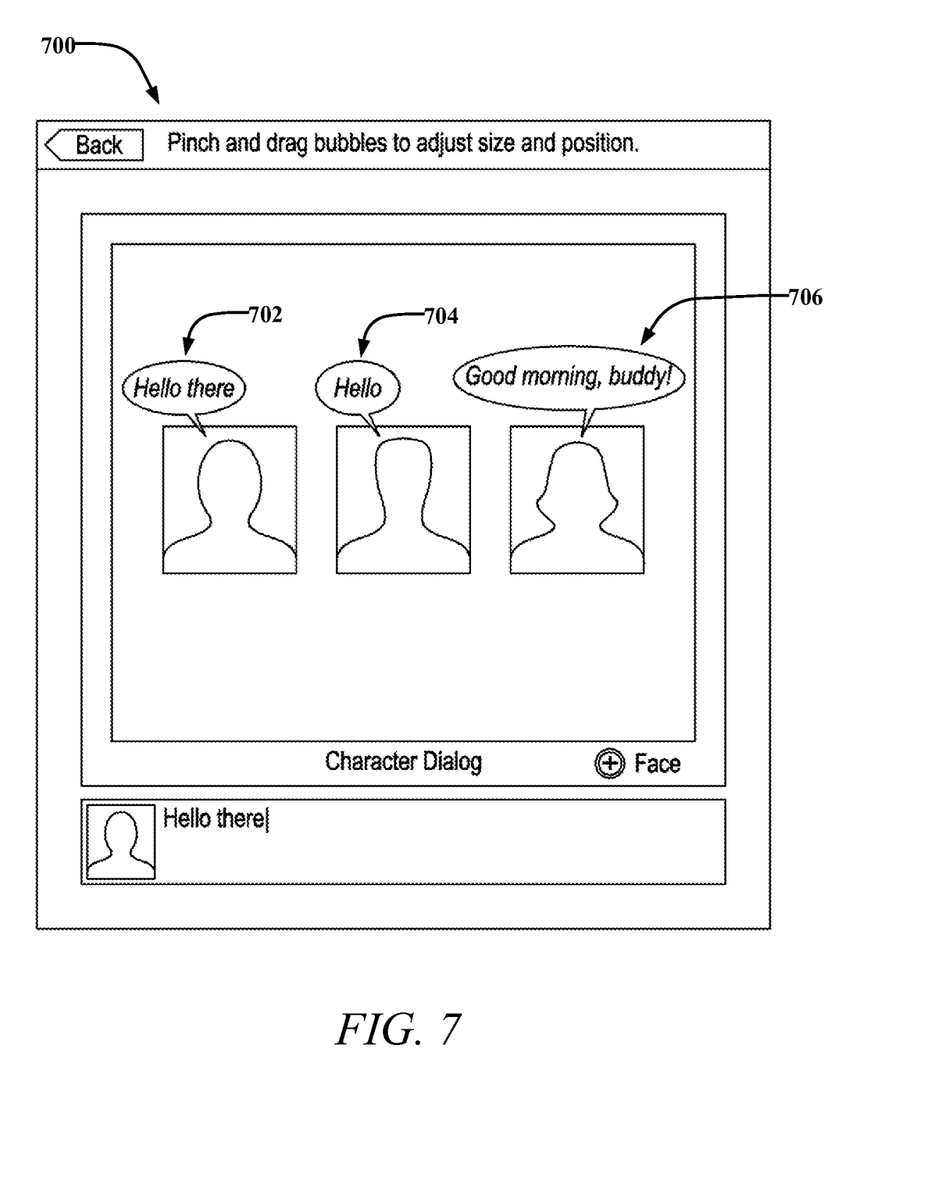
FIG. 7 illustrates an example screenshot of a speech bubble layout with changes to content in a first speech bubble affecting a second speech bubble.

FIG. 7 illustrates an example screenshot 700 of a speech bubble layout with changes to content in a first speech bubble 702 affecting a second speech bubble 704. The speech content added to the first speech bubble 702 causes the second speech bubble 704 to shift to allow room for the first speech bubble 702. A third speech bubble 706 remains unaffected by the changes to the first speech bubble 702 and the displacement of the second speech bubble 704.

Figure 8:
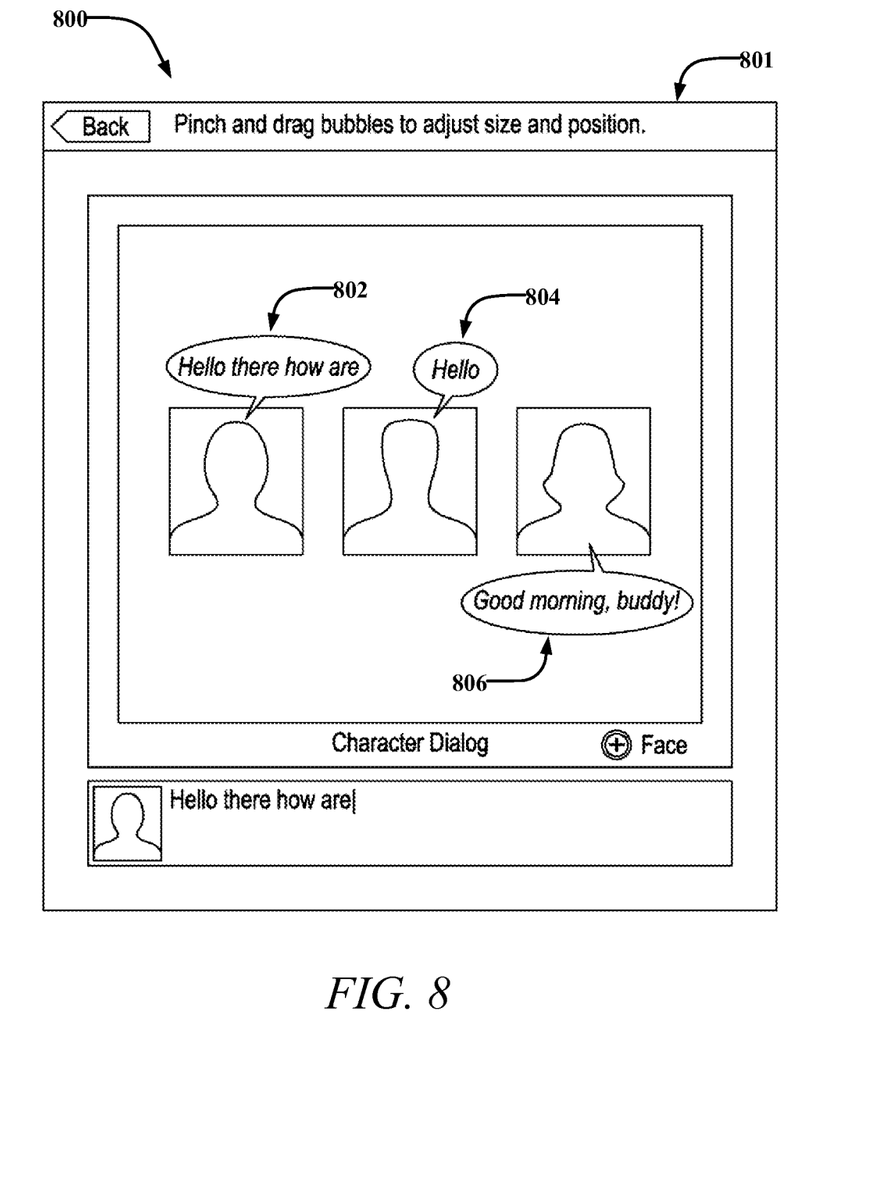
FIG. 8 illustrates an example screenshot of a speech bubble layout with changes to content in a first speech bubble affecting a second and third speech bubble.

FIG. 8 illustrates an example screenshot 800 of a speech bubble layout with changes to content in a first speech bubble 802 affecting a second speech bubble 804 and third speech bubble 806. The speech content added to the first speech bubble 802 causes the second speech bubble 804 and the third speech bubble 806 to shift to allow more room for the first speech bubble 802. As illustrated in FIG. 8, the third speech bubble 806 has been repositioned to the bottom of the image 801 to allow more room for the second speech bubble 804 at the top of the image 801.

Figure 9:
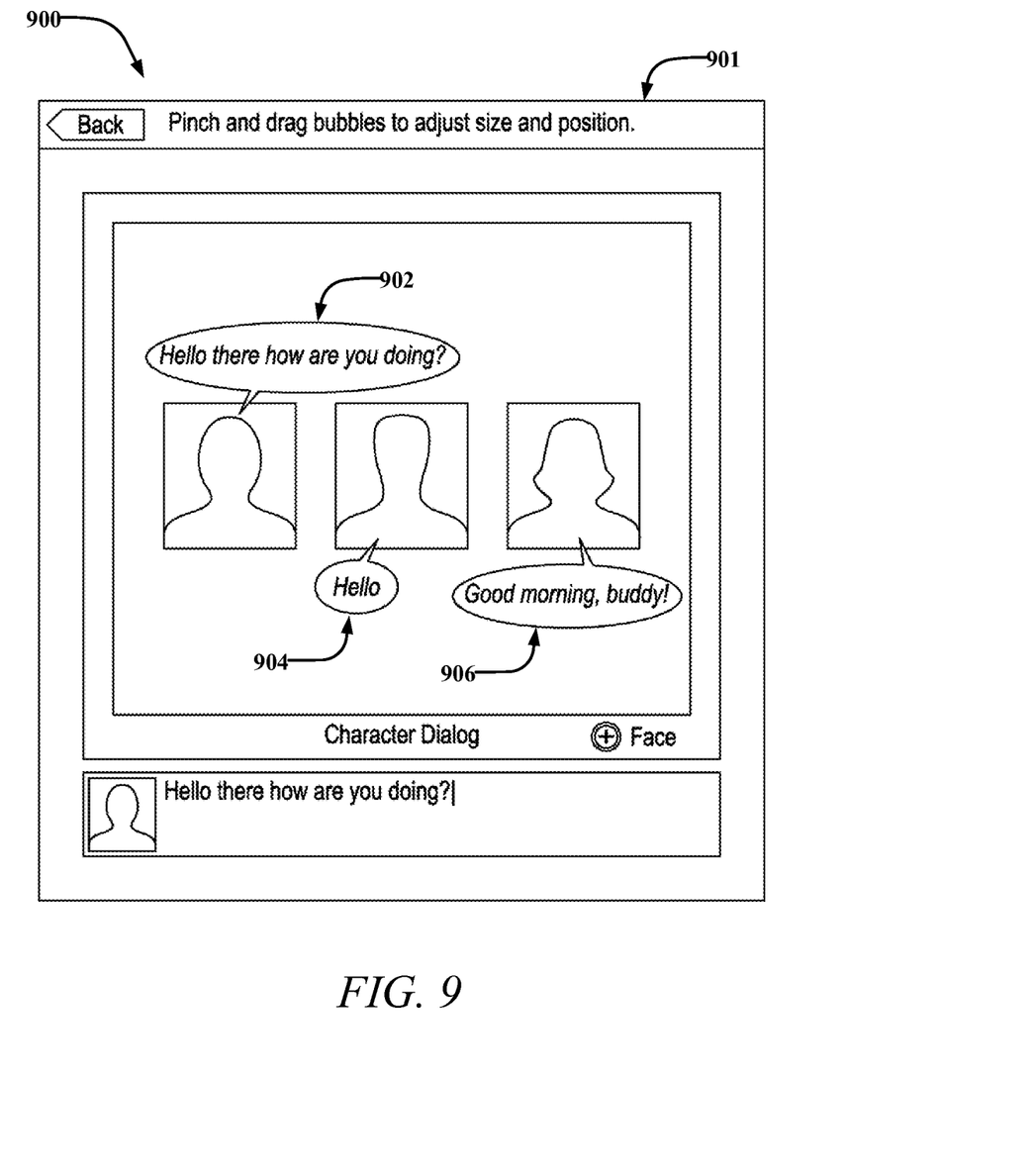
FIG. 9 illustrates an example screenshot of a speech bubble layout with changes to content in a first speech bubble affecting a second speech bubble.

FIG. 9 illustrates an example screenshot 900 of a speech bubble layout with changes to speech content in a first speech bubble 902 that affect a second speech bubble 904 and a third speech bubble 906. The speech content added to the first speech bubble 902 causes the second speech bubble 904 and the third speech bubble 906 to shift to allow more room for the first speech bubble 902. As illustrated in FIG. 9, the second and third speech bubbles 904, 906 have been repositioned to the bottom of the image 901 to allow more room for the first speech bubble 902 at the top of the image 901.

Figure 10:
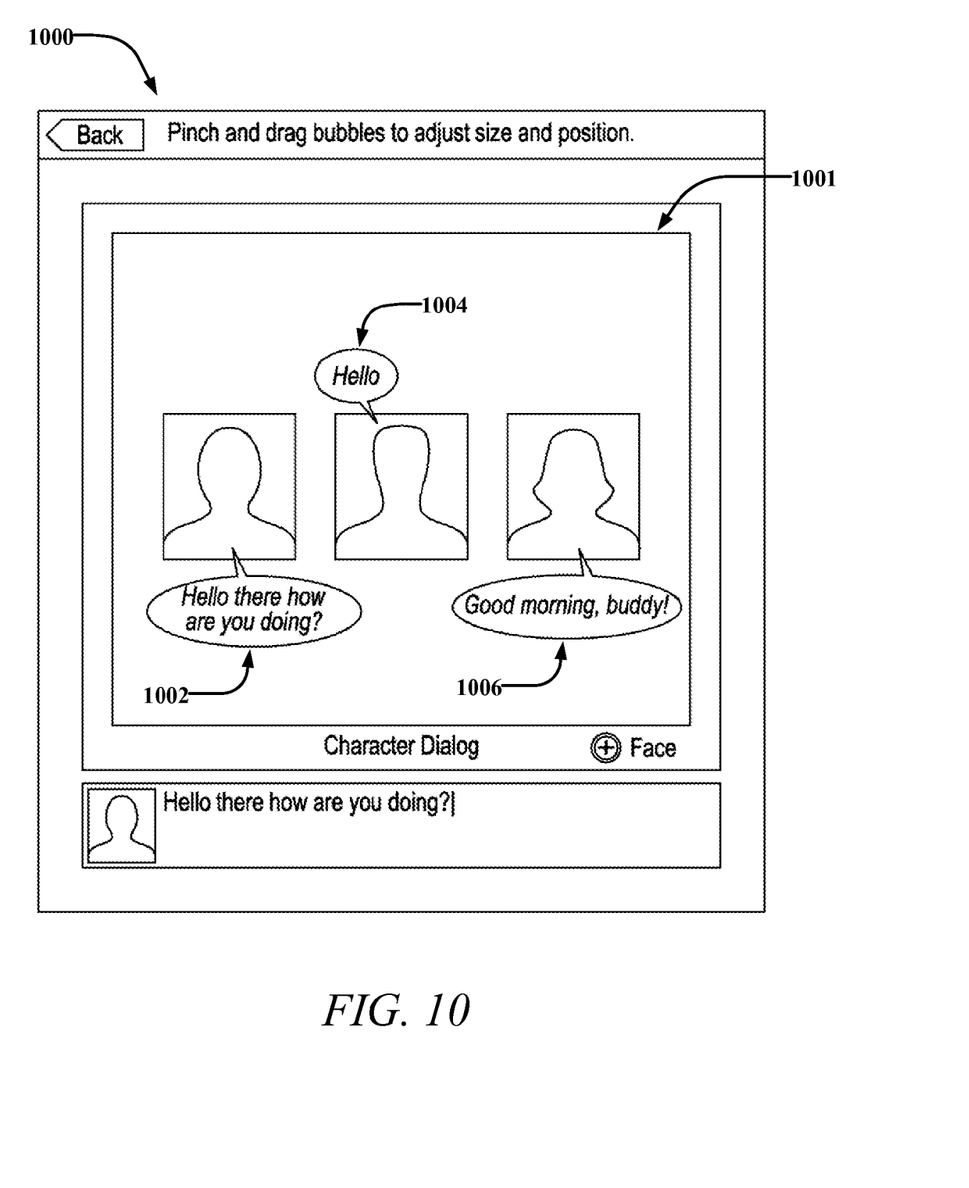
FIG. 10 illustrates an example screenshot of a speech bubble layout with changes to a position of a second speech bubble affecting a first speech bubble.

FIG. 10 illustrates an example screenshot 1000 of a speech bubble layout with changes to a position of a second speech bubble 1004 affecting a first speech bubble 1002. The repositioning of the second speech bubble 1004 may be based on the rearrangement of the order of conversation between the characters. For example, the second speech bubble 1004 is moved to the top of the image 1001 to show that the corresponding character is the first one to speak.

The repositioning of the second speech bubble 1004 also causes the first speech bubble 1002 and the third speech bubble 1006 to reposition themselves to allow more room for the second speech bubble 1004. As illustrated in FIG. 10, the first and third speech bubbles 1002, 1006 have been repositioned to the bottom of the image 1001 to allow more room for the second speech bubble 1004 at the top of the image 1001.

Figure 11:
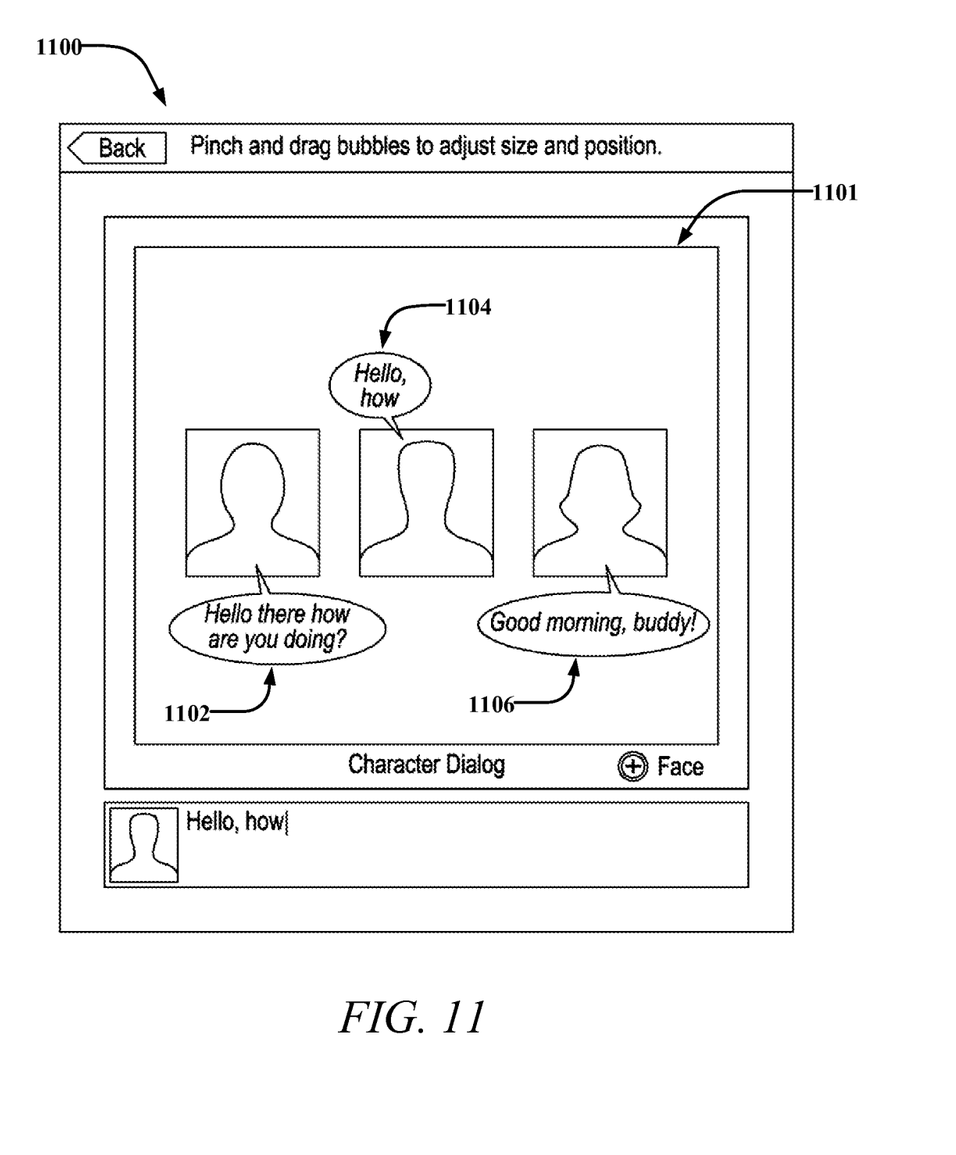
FIG. 11 illustrates an example screenshot of a speech bubble layout with constrained changes to content in a second speech bubble.

FIG. 11 illustrates an example screenshot 1100 of a speech bubble layout with changes to speech content in a second speech bubble 1104. The first and third speech bubbles 1102, 1106 remain at the bottom of the image 1101 to allow more room for the second speech bubble 1104 at the top of the image 1101.

Figure 12:
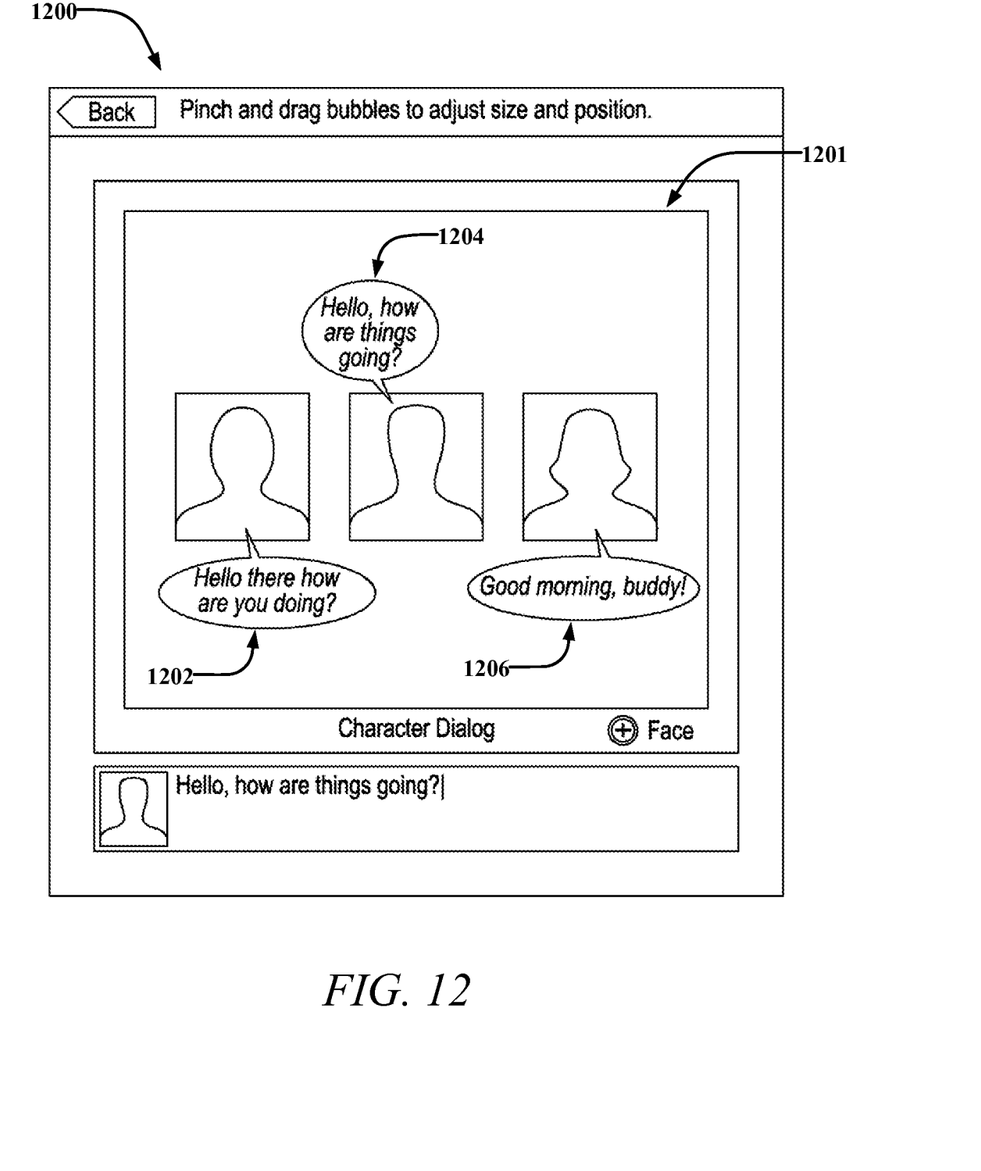
FIG. 12 illustrates an example screenshot of a speech bubble layout with further constrained changes to content in a second speech bubble.

FIG. 12 illustrates an example screenshot of a speech bubble layout with further changes to speech content in a second speech bubble 1204. The first and third speech bubbles 1202, 1206 remain at the bottom of the image 1201 to allow room for the second speech bubble 1204 at the top of the image 1201. The second speech bubble 1204 is partially outside the image 1201 within predefined constraints (e.g., a predefined margin).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. For example, software may accordingly configure a processor to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry or in computer hardware, firmware, software, or in combinations of them. Example embodiments may be implemented using a computer program product, (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and a server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below, are set out hardware (e.g., machine) and software architectures that may be deployed in various example embodiments.

Example Machine Architecture and Machine-Readable Medium

Figure 13:
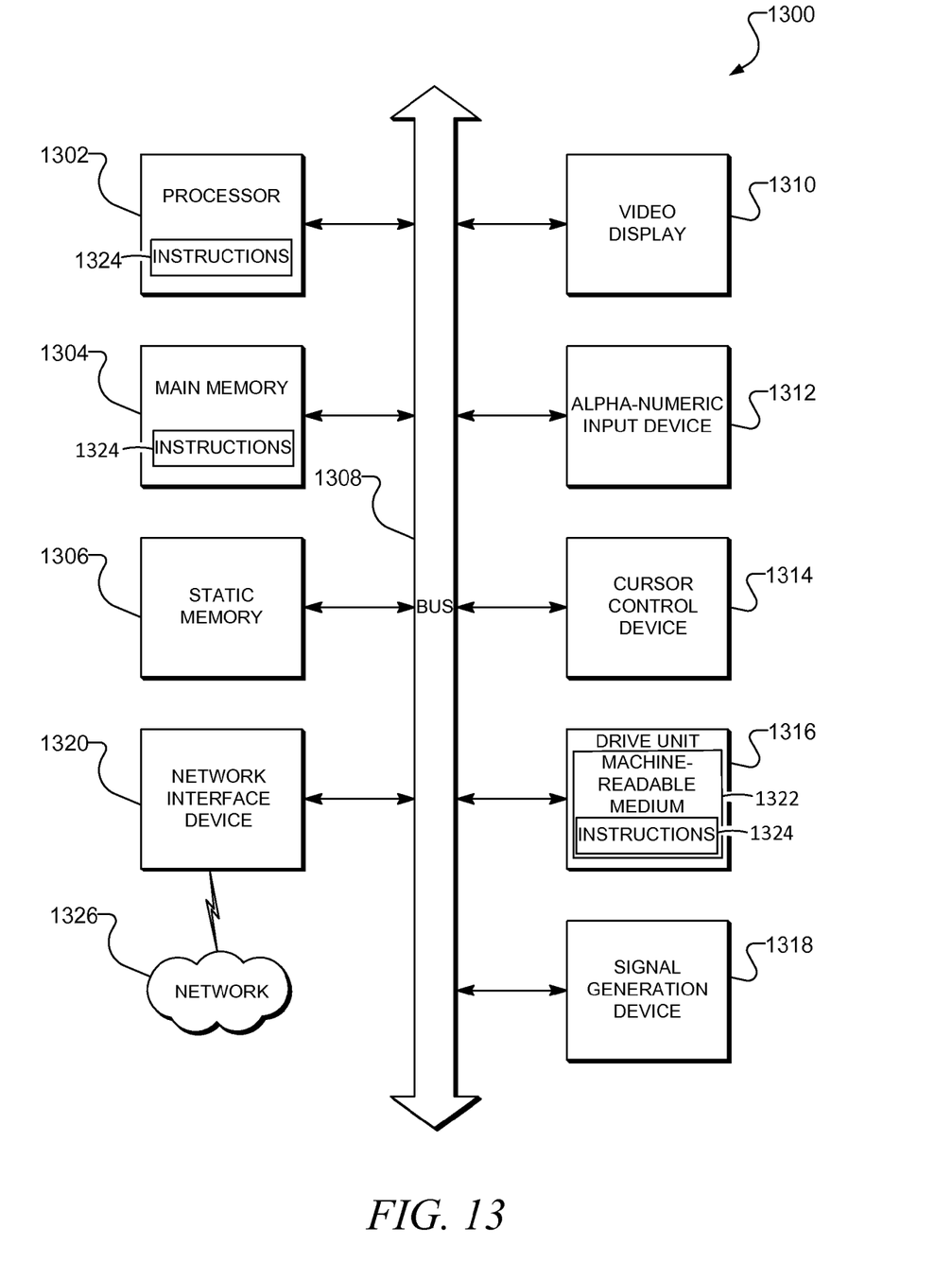
FIG. 13 shows a diagrammatic representation of a machine in the example form of a computer system within which a set of instructions may be executed to cause the machine to perform any one or more of the methodologies discussed herein.

FIG. 13 is a block diagram of a machine in the example form of a computer system 1300 within which instructions (e.g., 1326) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (e.g., 1326—sequential or otherwise) that specify actions to be taken by that machine. Further, while only a single machine is illustrated, the term "machine" shall also be taken to include any collection of machines that individually or jointly execute a set (or multiple sets) of instructions (e.g., 1326) to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation (or cursor control) device 1314 (e.g., a mouse), a disk drive unit 1316, a signal generation device 1318 (e.g., a speaker) and a network interface device 1320.

Machine-Readable Medium

The disk drive unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

The instructions 1324 may also reside, completely or at least partially, within the static memory 1306.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions (e.g., 1324) for execution by the machine and that cause the machine to perform any one or more of the methodologies of the present embodiments, or that is capable of storing, encoding or carrying data structures utilized by or associated with such instructions (e.g., 1324). The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; compact disc-read-only memory (CD-ROM) and digital versatile disc (or digital video disc) read-only memory (DVD-ROM) disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks 1326 include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions (e.g., 1324) for execution by the machine, and includes digital or analog communication signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. Therefore, this Detailed Description is not to be taken in a limiting sense, and the scope of various embodiments is defined only by the appended claims along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Although specific embodiments have been illustrated and described herein, it should be appreciated that any arrangement calculated to achieve the same purpose may be substituted for the specific embodiments shown. This disclosure is intended to cover any and all adaptations or variations of several embodiments. Combinations of the above embodiments and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the inventive subject matter lies in less than all features of a single disclosed embodiment. Thus, the following claims are hereby incorporated into the Detailed Description with each claim standing on its own as a separate embodiment.

What is claimed is:

1. A method comprising:
    determining geometric constraints for speech bubbles within an image, the image including characters, wherein the geometric constraints are based on boundaries of the characters within the image and boundaries of the image;
    determining features of the characters in the image;
    receiving speech content for the characters;
    identifying a conversation order of the speech content with respect to the characters; and
    generating a layout of the speech bubbles that defines a location and size of each speech bubble, with respect to the image, based on the geometric constraints, the features of the characters, the speech content, and the conversation order.

2. The method of claim 1,
    wherein determining features of the characters comprises:
        identifying each of the characters in the image;
        identifying a position of a mouth of each identified character;
        identifying an orientation of a face of each identified character; and
        determining a speech source of each identified character based on the respective position of the mouth and the respective orientation of the face for each identified character, wherein generating the layout of the speech bubbles is further based on the respective speech source for each identified character.

3. The method of claim 1, wherein the layout of the speech bubbles further defines a shape of the speech bubbles, and an identification of a position, size, and shape of text of the speech content within the speech bubbles.

4. The method of claim 1, further comprising:
    receiving user-defined constraints for one or more of the speech bubbles, the user-defined constraints defining a specific location, shape, or size of the one or more of the speech bubbles
    wherein generating the layout of the speech bubbles is further based on the user-defined constraints.

5. The method of claim 1, further comprising:
    receiving input modifying the speech content of the characters; and adjusting the layout of the speech bubbles based on the modified speech content of the characters.

6. The method of claim 1, further comprising:
based on the geometric constraints, identifying regions of importance in the image not to be obscured by the speech bubbles;
for each speech bubble, generating a plurality of frames, each frame of a corresponding speech bubble identifying different possible positions and sizes for the corresponding speech bubble; and
generating a ranking value for each frame of a corresponding speech bubble, the ranking value determined based on whether a frame overlaps the identified regions of importance.

7. The method of claim 6, further comprising:
identifying one or more frames for each speech bubble such that the speech bubbles do not overlap each other, and a relative position of each speech bubble with respect to an adjacent speech bubble is consistent with the order of conversation of the characters.

8. The method of claim 7, wherein generating the layout of the speech bubbles is based further on the ranking value for each identified frame.

9. The method of claim 1, wherein the speech content identifies a font type and a font size for text of the speech content wherein generating the layout of the speech bubbles is further based on the identified font type and font size.

10. A speech bubble layout system comprising:
a context module, executed with at least one processor, to:
determine geometric constraints for speech bubbles within an image, the image including characters;
determine features of the characters in the image;
receive a list of speech content for the characters; and
identify a conversation order of the characters based on an order of the list of speech content; and
a layout module to: generate a layout of the speech bubbles that defines a location and size of each speech bubble, with respect to the image, based on the geometric constraints, the features of the characters, the speech content, and the conversation order.

11. The speech bubble layout system of claim 10,
wherein the geometric constraints are based on boundaries of the image and boundaries of the characters,
wherein to determine the features of the characters comprises:
identification of each character in the image;
identification of a speech source for each identified character based on a position of a mouth of each identified character, and an orientation of a face of each identified character, wherein to generate the layout of the speech bubbles is further based on the respective speech source for each identified character.

12. The speech bubble layout system of claim 10, wherein the layout of the speech bubbles further defines a shape of the speech bubbles, and an identification of a position, size, and shape of text of the speech content within the speech bubbles.

13. The speech bubble layout system of claim 10, wherein the context module is configured to:
receive user-defined constraints for one or more of the speech bubbles, the user-defined constraints defining a specific location, shape, or size of the one or more of the speech bubbles, wherein the layout module is to generate the layout of the speech bubbles based further on the user-defined constraints.

14. The speech bubble layout system of claim 10, wherein the layout module is configured to:
receive input that modifies the speech content of the characters; and
adjust the layout of the speech bubbles based on the modified speech content of the characters.

15. The speech bubble layout system of claim 10, wherein the layout module is configured to:
based on the geometric constraints, identify regions of importance in the image not to be obscured by the speech bubbles;
for each speech bubble, generate a plurality of frames, each frame of a corresponding speech bubble identifying different possible positions and sizes for the corresponding speech bubble; and
generate a ranking value for each frame of a corresponding speech bubble, the ranking value determined based on whether a frame overlaps the identified regions of importance.

16. The speech bubble layout system of claim 15, wherein the layout module is configured to:
identify one or more frames for each speech bubble such that the speech bubbles do not overlap each other, and a relative position of each speech bubble with respect to an adjacent speech bubble is consistent with the order of conversation of the characters.

17. The speech bubble layout system of claim 16, wherein to
generate the layout of the speech bubbles is based further on the ranking value for each identified frame.

18. The speech bubble layout system of claim 10, wherein the speech content identifies a font type and a font size for text of the speech content, wherein the layout module is to generate the layout of the speech bubbles based further on the identified font type and font size.

19. A non-transitory machine-readable storage medium storing instructions which, when executed by at least one processor, cause the at least one processor to:
determine geometric constraints for speech bubbles within an image, the image including characters, wherein the geometric constraints are based on boundaries of the characters within the image and boundaries of the image;
determine features of the characters in the image;
receive a list of speech content for the characters;
identify a conversation order of the characters based on an order of the list of speech content; and
generate a layout of the speech bubbles that defines a location and size of each speech bubble, with respect to the image, based on the geometric constraints, the features of the characters, the speech content, and the conversation order.

* * * * *